US 6,641,641 B2

(12) United States Patent
Sohama et al.

(10) Patent No.: US 6,641,641 B2
(45) Date of Patent: Nov. 4, 2003

(54) METHOD FOR PRODUCING METAL OR METAL COMPOUND COMPRISING PROCESS OF TREATING WITH FLUORINE AND ADJUSTED RAW MATERIAL USED THEREIN

(75) Inventors: Yoshio Sohama, Tokyo (JP); Hiromichi Isaka, Tokyo (JP); Hiroyuki Watanabe, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 161 days.

(21) Appl. No.: 09/787,908

(22) PCT Filed: Dec. 18, 2000

(86) PCT No.: PCT/JP00/08948

§ 371 (c)(1),
(2), (4) Date: May 7, 2002

(87) PCT Pub. No.: WO02/22895

PCT Pub. Date: Mar. 21, 2002

(65) Prior Publication Data

US 2002/0174744 A1 Nov. 28, 2002

(51) Int. Cl.$^7$ .................................................. C22B 3/06
(52) U.S. Cl. .............................. 75/393; 75/392; 423/1; 423/20; 423/68
(58) Field of Search ................. 423/65, 68, 1, 423/20; 75/392, 393, 398, 303

(56) References Cited

U.S. PATENT DOCUMENTS

| 4,058,393 A | * | 11/1977 | McLaoughlin | |
| 4,349,513 A | | 9/1982 | Ishiwata et al. | 423/12 |
| 4,923,507 A | * | 5/1990 | Silva | 423/68 |
| 5,384,105 A | * | 1/1995 | Carlson | 423/65 |

FOREIGN PATENT DOCUMENTS

| JP | 48-38320 | | 11/1973 |
| JP | 55-113630 | | 9/1980 |
| JP | 57-57850 | A | 4/1982 |
| JP | 64-26199 | A | 1/1989 |

* cited by examiner

*Primary Examiner*—Ngoclan Mai
(74) *Attorney, Agent, or Firm*—Rothwell, Figg, Ernst & Manbeck, P.C.

(57) ABSTRACT

An object of the present invention is to provide a method for preventing concentration of a radioactive substance in a generated extraction residue in a method of producing tantalum, niobium, or a similar substance including collecting and refining a raw material containing the substances through a fluoridation process by use of a hydrofluoric acid-containing solution. The object can be attained by employing an ingredient-regulated raw material prepared from an ore or a concentrate and, as an additive, a substance insoluble to hydrofluoric acid or a mixed acid containing hydrofluoric acid as an essential component; or by increasing the amount of the extraction residue through addition of the insoluble substance to a solvent during the fluoridation process, to thereby reduce the relative radioactive substance content to an arbitrary value.

10 Claims, No Drawings

METHOD FOR PRODUCING METAL OR METAL COMPOUND COMPRISING PROCESS OF TREATING WITH FLUORINE AND ADJUSTED RAW MATERIAL USED THEREIN

TECHNICAL FIELD

The present invention relates to a method of producing a metal or a similar substance comprising collecting and refining the metal or substance contained in an ore or a concentrate containing a radioactive substance, and to an ingredient-regulated raw material employed in the method. Particularly, the technical idea of the method and the raw material according to the present invention are usefully applied to production of tantalum, niobium, or compounds thereof.

BACKGROUND ART

A widely-known method of producing a metal or a metal compound from an ore or a concentrate containing a radioactive substance serving as a raw material involves a fluoridation process—i.e., treating the raw material with hydrofluoric acid or a mixed acid containing, as an essential component, hydrofluoric acid, and separating the resultant mixture into an extract into which a metallic component is eluted and a residue—and collection and refinement of the metallic component from the extract.

Typical examples of metals and metal compounds produced through the above method include tantalum and niobium, which are contained in naturally occurring ores, and typical examples of ores employed in the method include rare earth ores containing a plurality of metallic elements; i.e., misch metals. The thus-produced metal, metal compound, or similar material is typically employed as a certain additive.

For example, tantalum, niobium, or compounds thereof (hereinafter these substances may be referred to as simply "tantalum, niobium, or a similar substance") find use such as an alloying element or compound for producing special steel or material for producing electronic apparatus, and such substances have become of interest. Thus, the range of such applications and the amount of the substances have increased remarkably. This trend has been accompanied by remarkably increasing demand for ores such as tantalite and columbite and concentrates obtained therefrom, which serve as raw material for collecting tantalum, niobium, or a similar substance.

However, in most cases, ores per se which are subjected to the production method contain small amounts (e.g., some wt. %) of radioactive element compounds such as oxides. For example, ores or concentrates which are employed for producing tantalum, niobium, or a similar material have been known to contain uranium oxide ($U_3O_8$) and thorium oxide ($ThO_2$). In such a case, these radioactive substances cannot be completely removed even when the ores are refined to corresponding concentrates through flotation, and remain as unavoidable components in the concentrates. Japanese Patent Application Laid-Open (kokai) No. 10-212532 also discloses such unavoidable components.

In terms of material containing at least a certain level of a radioactive substance, properties such as radioactive substance content are strictly limited by a variety of laws. For example, the Basel Convention prohibits cross-border transportation of a substance harmful to the human body. Thus, in some cases, as-prepared concentrate products cannot be imported and cannot be employed in the metal production industry. In such cases, the composition of ore material and concentrate material must be modified in accordance with the radioactive substance content.

In view of the foregoing, regarding ores or concentrates containing a radioactive substance employed for collecting a metal or a metal compound; i.e., the target of the present invention, those containing a large amount of a metal or a metal compound cannot be simply regarded as an excellent raw material in the industry at present. Throughout the industries of modern society, product stability and safety must be assured in consideration of steps of production, consumption, disposal, and further recycling. In addition, safety issues involving the environmental load imposed by wastes must be considered in view of the circumstances.

Specifically, when ores or concentrates contain a metal, a metal compound, or a similar substance at high content, the amount of the residue remaining after completion of extraction and refinement of a target metal, a target metal compound, or a similar substance is small. Given an initial level of radioactive elements in the ore or concentrate is the smaller the amount of generated residue, the higher the concentration of radioactive substances in the residue. Such a high concentration of radioactive substances is problematic in safety of handling the residue, and requires particular apparatus and a strict operational procedure. Thus, the above-described ores or concentrates are not preferred, in that handling the residue becomes more difficult and costs for waste disposal increase.

In addition, in recent years, the raw material situation has disadvantageously been aggravated. Particularly, the raw material situation for tantalum and niobium has become tighter in accordance with an increasing demand therefor, and raw materials of low radioactive element content are difficult to obtain. In view of the foregoing, there has been demand for a technique for safe transportation of concentrates containing a radioactive substance, exerting effects on refinement of tantalum, niobium, and similar substances.

SUMMARY OF THE INVENTION

The present inventors have conducted earnest studies, and as a result have accomplished the present invention as described hereunder.

In claim 1 of the present invention, there is provided a method of producing a metal or a metal compound from an ingredient-regulated raw material obtained by mixing an ore or a concentrate containing a radioactive substance, which method involves a fluoridation process—i.e., treating the ingredient-regulated raw material with hydrofluoric acid or a mixed acid containing, as an essential component, hydrofluoric acid, and separating the resultant mixture into an extract into which a metallic component is eluted and an extraction residue—and collection and refinement of the metallic component from the extract, wherein the employed ingredient-regulating raw material comprises the ore or the concentrate containing a radioactive substance and, as an additive, a substance insoluble to hydrofluoric acid or to a mixed acid containing, as an essential component, hydrofluoric acid, to thereby control to an arbitrary value of 1.0 wt. % or less the ratio of the amount of the radioactive substance remaining in the extraction residue generated through the fluoridation process to the weight of the extraction residue.

In claim 2 of the present invention, there is provided a method of producing tantalum, niobium, or a similar substance from an ingredient-regulated raw material obtained by mixing an ore or a concentrate containing at least one of tantalum and niobium and a radioactive substance, which method involves a fluoridation process—i.e., treating the ingredient-regulated raw material with hydrofluoric acid or a mixed acid containing, as an essential component, hydrofluoric acid, and separating the resultant mixture into an extract into which a metallic component is eluted and an extraction residue—and collection and refinement of tantalum, niobium, or a similar substance from the extract, wherein the employed ingredient-regulating raw material comprises the ore or the concentrate containing a radioactive substance and, as an additive, a substance insoluble to hydrofluoric acid or to a mixed acid containing, as an essential component, hydrofluoric acid, to thereby control to an arbitrary value of 1.0 wt. % or less the ratio of the total amount of the radioactive substances, $U_3O_8$ and $ThO_2$, remaining in the extraction residue generated through the fluoridation process to the weight of the extraction residue.

The method of producing a metal or a metal compound according to the present invention can be applied to a variety of those methods which employ an ore or a concentrate containing a radioactive substance and involve a fluoridation process; i.e., treating a raw material with hydrofluoric acid or a mixed acid containing, as an essential component, hydrofluoric acid, and separating the resultant mixture into an extract into which a metallic component is eluted and an extraction residue. The types of ores and concentrates and the species and the amounts of the radioactive substances contained in the ores or concentrates vary in accordance with the type of the target metal or substance to be collected and refined. Therefore, imposing definite limitations on the above values and uses in claim 1 is difficult. Thus, in claim 1, the present inventors have not imposed such limitations. The idea of claim 1 of the present invention is considered to be applied to production of zirconium, hafnium, tungsten, molybdenum, and titanium as well as to tantalum and niobium.

In order to clarify that the method can be suitably applied to collection and refinement of tantalum, niobium, or a similar substance; i.e., the issue of current interest, a method of producing tantalum, niobium, or a similar substance is recited in claim 2. As is clear from claims 1 and 2, a method of producing tantalum, niobium, or a similar substance as recited in claim 2 can be considered to be one example for describing the present invention as recited in claim 1. Thus, the idea of the present invention as recited in claim 1 is also described hereunder with reference to claim 2.

One predominant target application of the method of the present invention is considered to be application to the case in which naturally-occurring ores of high radioactive element content which are subjected to elevation of tantalum and niobium grade through a method such as flotation, to thereby form corresponding concentrates also having a high radioactive element content. The reason why ores are transformed to concentrates is that raw materials of high target component content are generally preferred for production of tantalum, niobium, or a similar substance, in view of transportation efficiency and productivity of raw material.

In the present specification, the expression "an ore or a concentrate for producing tantalum, niobium, or a similar substance" refers to an ore such as columbite ore, tantalite ore, samarskite ore, pyrochlore, or euxenite, or a corresponding concentrate whose tantalum grade or niobium grade is enriched through a physical method such as flotation. When other metallic species are to be collected, a corresponding ore or concentrate is used. The expression also encompasses appropriate ingredient-regulated mixtures of the aforementioned ore and concentrate, two or more ores, and two or more concentrates.

Regarding ores for producing tantalum, niobium, or a similar substance, columbite ore contains $Nb_2O_5$ at a content of approximately 70–85 wt. %, tantalite ore contains $Ta_2O_5$ at a content of approximately 75–90 wt. %, and samarskite ore contains $Nb_2O_5$ and $Ta_2O_5$ at a total content of approximately 40–60 wt. %. Other than $Nb_2O_5$ and $Ta_2O_5$ these ores contain, as impurity components, compounds such as silicates, iron oxide, and manganese oxide. Thus, these ores are classified into three types: ores for producing tantalum and tantalum compounds; ores for producing niobium and niobium compounds; and ores for simultaneously producing tantalum, niobium, and compounds thereof. Accordingly, the expression "tantalum, niobium, or a compound thereof" in the present specification refers to tantalum or a tantalum compound; niobium or a niobium compound; and tantalum, niobium, and compounds containing tantalum and/or niobium.

These ores also contain small amounts of radioactive elements, such as uranium and thorium in the forms of $U_3O_8$ and $ThO_2$, and these radioactive elements are incorporated into concentrates which are obtained from the corresponding ores through flotation. Although typically-employed concentrates contain these radioactive elements in a total amount of approximately 0.05 wt. % ($U_3O_8+ThO_2$), some ores to be processed into the corresponding concentrates contain more than 0.1 wt. % of radioactive elements. Since ores or concentrates, inter alia ores, generally have a low radioactive element content, the content per se does not present a serious problem. However, some concentrates have a radioactive element content of more than 1 wt. %, depending on the degree of flotation of the corresponding ores, as will be described in another portion of the specification.

In order to obtain tantalum, niobium, and compounds thereof from the above-described concentrates or ores, there has been widely employed a fluoridation treatment process in which components such as tantalum and niobium are taken up through extraction by use of hydrofluoric acid or a mixed acid solution containing hydrofluoric acid as an essential component. For the sake of understanding of the description of the present invention and simplicity, some typical methods of producing tantalum, niobium, and a similar material will be described.

At first, an extraction process including alkali pretreatment will be described. As a first step, an ore or a concentrate is treated with caustic soda. After completion of the alkali pretreatment, the pH of the solution is adjusted to 3 or less, to thereby elute into the alkali pretreated solution a silicate, an iron compound, or a manganese compound contained in the ore or concentrate. During alkali pretreatment, components such as niobium and tantalum are converted to insoluble basic salts thereof, remaining in precipitates formed during the pretreatment. Subsequently, the precipitates are treated with an extracting agent, in the form of hydrofluoric acid or a mixed acid containing hydrofluoric acid as an essential component, to thereby elute components such as tantalum and niobium into the resultant extract. The insoluble extraction residue is then separated from the extract by use of means such as a filter press. In the above method, the expression "fluoridation process employing hydrofluoric acid or a mixed acid containing hydrofluoric acid as an essential component" refers to the above steps. Subsequently, the components such as tantalum and niobium contained in the thus-formed extract are collected and refined through a generally known method.

Another method is a direct extraction method in which the above-performed alkali pretreatment by use of caustic soda is not employed. Instead, an ore or a concentrate is directly treated with an extracting agent, in the form of hydrofluoric acid or a mixed acid containing hydrofluoric acid as an essential component, to thereby elute components such as tantalum and niobium into the resultant extract. The insoluble extraction residue is then separated from the extract by use of means such as a filter press. In the case of the direct extraction process, the expression "fluoridation process employing hydrofluoric acid or a mixed acid containing hydrochloric acid as an essential component" refers to the above step. Being different from the extraction method including alkali pretreatment, the extract contains not only target components such as tantalum and niobium but also impurity components such as iron and manganese which are simultaneously dissolved into the extract. In a manner similar to that of the extraction method including alkali pretreatment, the insoluble extraction residue is then separated from the extract by use of means such as a filter press, and the components contained in the thus-formed extract are collected and refined.

In addition to the above two methods, a variety of methods of producing tantalum, niobium, or a similar substance are known. Without exception, these methods also include a fluoridation process employing, as an extracting agent, hydrofluoric acid or a mixed acid containing hydrofluoric acid as an essential component.

The present inventors have performed extensive studies on radioactive elements contained in ores and concentrates employed in collection and refinement of tantalum, niobium, or a similar substance, and have found that the radioactive elements contained in ores and concentrates cannot be removed through the alkali pre-treatment involved in the extraction method; cannot be dissolved in hydrofluoric acid or a mixed acid containing hydrofluoric acid as an essential component; and remain in the extraction residue generated during the fluoridation process.

Such an extraction residue is produced in a certain amount based on the weight of the employed ore or concentrate, the amount varying depending on the type of ore and the flotation level. The greater amount of the initially contained radioactive elements remains in the extraction residue. Thus, the radioactive element content in the extraction residue is elevated several fold as compared with that in the ore or concentrate; i.e., the content in an initial stage. Generation of the extraction residue is one serious problem encountered in the methods of producing tantalum, niobium, or a similar substance.

In view of the foregoing, the present inventors have deduced the concept that, if the percentage (i.e., % content) of radioactive substances present in the extraction residue is the problem, an increase in the total amount of the residue results in a decrease in the percentage of the radioactive substances contained in the residue. It is considered that one of the simplest and most effective ways to increase the total amount of the extraction residue is incorporation of an additive which constitutes the residue.

However, properties of the additive must be taken into consideration in the aforementioned case; i.e., an additive which adversely affects collection and refinement of tantalum, niobium, or a similar substance thereof cannot be employed. In other words, additives which deteriorate recovery, purity, or a similar property of produced tantalum, niobium, or a similar substance thereof in the production process cannot be employed.

Thus, the present inventors have investigated as many methods of producing tantalum, niobium, or a similar substance as possible, and have found that a fluoridation process in which extraction treatment is performed by use of hydrofluoric acid or a mixed acid containing hydrofluoric acid as an essential component is only one possible stage where the additive component added to raw material is modified to adversely affect collection and refinement. In other words, when the additive is not modified by hydrofluoric acid or a mixed acid containing hydrofluoric acid as an essential component employed in the fluoridation process or forms precipitates by the acids, the additive remains in the extraction residue. In this case, the additive does not affect collection and refinement of tantalum, niobium, or a similar substance. Typically, sulfuric acid is employed as an acid which constitutes the mixed acid containing hydrofluoric acid as an essential component. Other than sulfuric acid, acids such as hydrochloric acid and nitric acid may be employed in accordance with the nature of the employed production method.

Thus, in claims 1 and 2 of the present invention, "a substance insoluble to hydrofluoric acid or to a mixed acid containing hydrofluoric acid as an essential component" is employed as an additive which does not completely dissolve and remains in the residue even when the additive is treated with hydrofluoric acid or with a mixed acid containing hydrofluoric acid as an essential component. The additive is incorporated into an ore or a concentrate serving as a raw material, to thereby prepare an ingredient-regulated raw material. By use of the thus-prepared raw material, the relative radioactive element content in the extraction residue is lowered.

The radioactive content of substance is restricted by standard values determined by each country on the basis of scientific criteria that take into consideration effects on the human body and the environment. Since in each country the standard values are codified in laws, radioactive substances must be handled while respecting and obeying such laws. In direct opposition to this, from a viewpoint of producers who carry out collection and refinement of tantalum, niobium, or a similar substance, the larger the amount of the extraction residue, the greater the costs required for residue treatment. The waste cost may elevate the price of products of tantalum, niobium, or a similar substance, and the elevated price retards distribution of such products, to thereby possibly retard development of the industry.

Under such circumstances, the amount of extraction residue must be determined for respective countries in consideration of laws and minimum production costs. In addition, the amount of an insoluble substance incorporated into the ingredient-regulated raw material must be controlled in accordance with the tantalum grade or niobium grade and the radioactive element content of employed ores or concentrates. Thus, definite determination of the amount of the insoluble substance is difficult. In the present invention, the amount of the insoluble substance is considered to be determined within a range so as to most effectively satisfy laws of each country throughout the world and avoid adverse effects on the human body.

Thus, the present inventors have considered that claim 2 discloses no clear amount of the insoluble substance to be added and that the amount is determined on the basis of the amount of radioactive substance in the extraction residue which results from a fluoridation process. As recited in claim 2, the insoluble substance is added so as to "control to an arbitrary value of 1.0 wt. % or less the ratio of the total amount of the radioactive substances, $U_3O_8$ and $ThO_2$, remaining in the extraction residue generated through the fluoridation process to the weight of the extraction residue."

According to the present invention, control for attaining an arbitrary value of the ratio of the total amount of the radioactive substances remaining in the extraction residue to the weight of the extraction residue can readily be carried out by controlling the amount of the additive during preparation of ingredient-regulated raw material.

The present specification employs the expression "the radioactive substances, $U_3O_8$ and $ThO_2$, remaining in the extraction residue" included in the method of producing tantalum, niobium, or a similar substance, for the following reasons. In the present specification, the total amount of $U_3O_8$ and $ThO_2$ is obtained by analyzing an extraction residue by means of an X-ray fluorescent analyzer to thereby determine the amounts of U and Th and calculating the amounts of oxides; i.e., $U_3O_8$ and $ThO_2$. When determination is performed through instrumental analysis such as X-ray fluorescent analysis, bonding states of U and Th cannot be obtained, and specific radioactive species in which the bonding states are clearly elucidated are difficult to determine. From another viewpoint, the above analysis can readily be controlled when such widely employed instruments such as an X-ray fluorescence analyzer are employed.

In addition, the methods of producing tantalum, niobium, or a similar substance as recited in claims 1 and 3 are advantageous when an ore or a concentrate serving as a raw material originally contains a radioactive substance at a level exceeding the standard value. In this case, a certain amount of an additive is added to the raw material, to thereby prepare an ingredient-regulated raw material, which enables the raw material to be handled more easily.

Another method for reducing the radioactive element content in an extraction residue is recited in claim 3 of the present invention. In claim 3, there is provided a method of producing a metal or a metal compound from an ore or a concentrate containing a radioactive substance, which method involves a fluoridation process—i.e., treating the ingredient-regulated raw material with hydrofluoric acid or a mixed acid containing hydrofluoric acid as an essential component, and separating the resultant mixture into an extract into which a metallic component is eluted and an extraction residue—and collection and refinement of the metallic component from the extract, wherein the ore or the concentrate containing a radioactive substance is employed as a raw material, and a substance insoluble to hydrofluoric acid or to a mixed acid containing hydrofluoric acid as an essential component employed in a fluoridation process is added during the fluoridation process, to thereby control to an arbitrary value of 1.0 wt. % or less the ratio of the amount of the radioactive substance remaining in the extraction residue generated through the fluoridation process to the weight of the extraction residue.

In claim 4, there is provided a method of producing tantalum, niobium, or a similar substance from an ore or a concentrate containing at least one of tantalum and niobium and a radioactive substance, which method involves a fluoridation process—i.e., treating the ingredient-regulated raw material with hydrofluoric acid or a mixed acid containing hydrofluoric acid as an essential component, and separating the resultant mixture into an extract into which a metallic component is eluted and an extraction residue—and collection and refinement of the metallic component from the extract, wherein the ore or the concentrate containing at least one of tantalum and niobium and a radioactive substance is employed as a raw material, and a substance insoluble to hydrofluoric acid or to a mixed acid containing hydrofluoric acid as an essential component employed in a fluoridation process is added during the fluoridation process, to thereby control to an arbitrary value of 1.0 wt. % or less the ratio of the amount of the radioactive substances, $U_3O_8$ and $ThO_2$, remaining in the extraction residue generated through the fluoridation process to the weight of the extraction residue.

The production methods as recited in claims 3 and 4 are advantageous particularly when the radioactive substance content of the extraction residue generated through the aforementioned fluoridation process presents a serious problem even though an ore or a concentrate serving as a raw material originally contains a radioactive substance at a level below the standard value. Since the relationship between claims 3 and 4 is similar to that between claims 1 and 2, claim 4 will be described to also cover description of claim 3.

Specifically, a substance insoluble to hydrofluoric acid or to a mixed acid containing hydrofluoric acid as an essential component employed in a fluoridation process is added during the fluoridation process. Several modes for addition can be employed; e.g., (1) pretreating an ore or a concentrate with an alkali such as caustic soda as employed in an extraction method including alkali pretreatment employed for producing tantalum or niobium; adding an additive immediately before subjection to a fluoridation process; and performing treatment in an extraction bath containing the additive and a mixed acid containing hydrofluoric acid as an essential component; (2) adding the additive to an extraction bath containing a mixed acid containing hydrofluoric acid as an essential component during a fluoridation process and treating an ore or a concentrate in the bath; and (3) treating an ore or a concentrate in an extraction bath containing a mixed acid containing hydrofluoric acid as an essential component during a fluoridation process and adding a certain amount of the additive to the resulting extraction residue.

By controlling the amount of additive in a manner as mentioned above, the radioactive substance content in the extraction residue can be controlled to an arbitrary value as recited in claims 1 and 2. Thus, the radioactive substance content can be controlled to an arbitrary value in accordance with the standard value employed in the respective country.

The ingredient-regulated raw material which is to be employed in claim 1 or 2 will next be described. Regarding the ingredient-regulated raw material, claims 5 and 6 specify the compositional range of an ore or a concentrate to be employed and the amount of the additive to be added to the ore or the concentrate.

In claim 5 there is provided an ingredient-regulated raw material to be employed in a method of producing a metal or a metal compound as recited in claim 1, which is a mixture comprising an ore or a concentrate containing a radioactive substance and a target metal or a similar substance at a grade of 50 wt. % or more based on the weight of the ore or the concentrate and at least, as an additive, a substance insoluble to hydrofluoric acid in an amount corresponding to the amount of the raw material removed through dissolution-extraction by use of hydrofluoric acid or insoluble to a mixed acid containing hydrofluoric acid as an essential component employed in the fluoridation process. In claim 6, there is provided an ingredient-regulated raw material to be employed in a method of producing tantalum, niobium, or a compound thereof as recited in claim 2, which is a mixture comprising an ore or a concentrate containing $Ta_2O_3$ and $Nb_2O_5$ in a total amount of 50 wt. % or more based on the weight of the ore or the concentrate and at least, as an additive, a substance insoluble to hydrofluoric acid in an amount corresponding to the amount of the raw material removed through dissolution-extraction by use of hydrofluoric acid or insoluble to a mixed acid containing hydrofluoric acid as an essential component employed in the fluoridation process.

The term "ingredient-regulated raw material" refers to a mixture comprising an ore or a concentrate and, as an additive, a substance insoluble to hydrofluoric acid. The mixture is employed in a production method as recited in claim 1 or 2. Selection of such ingredient-regulated raw material described herein is based on the following two reasons.

One reason is to assure safety in cross-border international trading of raw material employed for collecting and refining tantalum, niobium, or a similar substance. For example, when an ore obtained in a certain country possessing a mine exhibits a high original radioactive substance content or the ore is subjected to flotation to prepare the corresponding concentrate in the country, the radioactive substance content in the ore or the concentrate may exceed the legal standard value of another county which imports the ore or the concentrate. In such a case, other minerals have been added to the ore or the concentrate to satisfy the standard value of the said other country. However, no particular consideration has been given to the minerals to be added. Accordingly, an ingredient-regulated raw material according to the present invention, which incorporates an additive in the form of a substance insoluble to hydrofluoric acid, can prevent concentration of a radioactive substance at a problematic level in a residue generated through a subsequent fluoridation process—one step for producing tantalum, niobium, or a similar substance.

The other reason will now be described. The present inventors have conducted earnest studies, and have found, so far as the present inventors have confirmed, that problematic concentration of a radioactive substance in a residue during a fluoridation process for producing tantalum, niobium, or a similar substance occurs only when the ore or the concentrate contains $Ta_2O_5$ and $Nb_2O_5$ in a total amount of 50 wt. % or more based on the weight of the ore or the concentrate and the resultant extraction residue accounts for a low amount. In other words, when the ore or the concentrate contains $Ta_2O_5$ and $Nb_2O_5$ in a total amount of 50 wt. % or less based on the weight of the ore or the concentrate, no additive is required. Even though a certain additive is employed, the concentration of a radioactive substance in the residue generated through a fluoridation process does not present a serious problem. The degree of concentration varies slightly in accordance with the production method, ores to be employed, and other factors, and "a total amount of $Ta_2O_5$ and $Nb_2O_5$ of 50 wt. % or more based on the weight of the ore or the concentrate" as recited in claim 3 also varies slightly. However, by taking into account a safety factor of treatment of the residue in which a radioactive substance is concentrated, the ingredient—regulated raw material is suited for an ore or a concentrate containing $Ta_2O_5$ and $Nb_2O_5$ in a total amount (grade) of 50 wt. % or more based on the weight of the ore or the concentrate.

The ingredient-regulated raw material as recited in claim 5 or 6 contains "at least, as an additive, a substance insoluble to hydrofluoric acid in an amount corresponding to the amount of the raw material removed through dissolution-extraction by use of hydrofluoric acid or insoluble to a mixed acid containing hydrofluoric acid as an essential component employed in the fluoridation process." Briefly, when the ore or the concentrate to be employed as a raw material which contains a radioactive substance in such a low amount that presents no problem, preventing concentration of the radioactive substance in the residue generated during the fluoridation process is sufficient. Accordingly, when an additive is added at least in an amount corresponding to the difference between the initial weight of the ore or the concentrate and the weight of the extraction residue, the radioactive substance content in the extraction residue and that of the ore or the concentrate are equal to each other. Thus, the amount of the insoluble substance can be determined easily, and the method is appropriate in consideration of safe operation.

In claim 7, there is provided an ingredient-regulated raw material as recited in claim 5 or 6, wherein the substance insoluble to hydrofluoric acid or a mixed acid containing hydrofluoric acid as an essential component serving as an additive for the raw material is added such that the amount of the substance reaches 5–50 wt. % of the ingredient-regulated raw material. In claim 8, there is provided an ingredient-regulated raw material as recited in claim 5 or 7, wherein the substance insoluble to hydrofluoric acid or a mixed acid containing hydrofluoric acid as an essential component serving as an additive is at least one component included in an extraction residue of an ore or a concentrate generated through a fluoridation process involved in a method of producing a metal or a metal compound. The appropriate proportion of the insoluble substance in the ingredient-regulated raw material is defined in this claim.

As described above, the insoluble substance is added in a required amount which is determined on the basis of the amount of the extraction residue generated through a fluoridation process of an ore or a concentrate for producing tantalum, niobium, or a similar substance. Accordingly, the relative radioactive substance content in the residue is preferably controlled to as low a level as possible by adding the insoluble substance. However, the lower relative radioactive substance content is equivalent to the larger amount of the extraction residue. As a result, the large amount affects efficiency of producing a metal or a similar substance to be collected and elevates the load of residue treatment. Thus, the amount of an insoluble substance to be added is appropriately modified in consideration of the aforementioned effects.

The present inventors have conducted extensive studies, and have found that, most preferably, the insoluble substance is added such that the amount of the substance is controlled to 5–50 wt. % of the weight of the ingredient-regulated raw material. When the proportion of the added insoluble substance is less than 5 wt. % based on the weight of the ingredient-regulated raw material, dilution effect is poor in the case in which a currently available high-grade concentrate is employed; i.e., the relative radioactive substance content in the extraction residue cannot effectively be reduced (one object of the present invention). In addition, such an addition is not effective when the operational safety factor is taken into account. When a low-grade ore such as an ore of a grade of 10 wt. % or less is employed, addition of the insoluble substance in a small amount may be acceptable. In such a case, a 5 wt. % addition is considered to be sufficient even when the operational safety factor is taken into account.

In contrast, addition of the insoluble substance such that the amount of the substance reaches 50 wt. % or more of the ingredient-regulated raw material presents no problem, or is preferred in that the relative radioactive substance content is reduced. However, generally, taking into account the minimum required production efficiency for attaining commercial viability and costs for extraction residue treatment, when the amount of added insoluble substance is in excess of 50 wt. % based on the ingredient-regulated raw material, cost performance is drastically lowered and commercial operation becomes difficult. In addition, the present inventors have investigated factors such as the grade of currently available ores and concentrates and safety factor in operation, and have found that, most preferably, the insoluble substance is added such that the amount of the substance reaches 16–33 wt. % of the ingredient-regulated raw material, in view of production efficiency and safety to the human body. Claims 7 and 8 are based on the aforementioned criteria.

The additive; i.e., "a substance insoluble to hydrofluoric acid or to a mixed acid containing hydrofluoric acid as an essential component" must not be detrimental to efficiency of collection and refinement of the products, purity of the products, and other properties in a method of the present invention of producing a metal or a metal compound such as tantalum, niobium, or a compound thereof. Thus, the present inventors have analyzed the components contained in the extraction residue generated by subjecting an additive-free ore or concentrate to a fluoridation process by use of hydrofluoric acid or a mixed acid containing hydrofluoric acid as an essential component during production of a metal or a metal compound, and have considered that a component contained in the residue is employed as "a substance insoluble to hydrofluoric acid or to a mixed acid containing hydrofluoric acid as an essential component."

When a component originally contained in the extraction residue is employed as an additive, factors such as efficiency of collection and refinement of the products and purity of the products are not affected and no additional step is required during residue treatment. From this criterion, in claim 8, there is provided an ingredient-regulated raw material as recited in claim 5 or 7, wherein at least one component contained in an extraction residue generated by subjecting an ore or a concentrate to a fluoridation process involved in a method of producing a metal or a metal compound is employed as the additive; i.e., as a substance insoluble to hydrofluoric acid or to a mixed acid containing hydrofluoric acid as an essential component.

Needless to say, the composition of an extraction residue varies in accordance with the type of ores or concentrates employed. In order to obtain tantalum and niobium—metals of interest at present, in claim 9, there is provided an ingredient-regulated raw material as recited in claim 6 or 7, wherein the substance insoluble to hydrofluoric acid or to a mixed acid containing hydrofluoric acid as an essential component serving as an additive, comprises at least one species selected from among barium oxide, barium sulfate, aluminum oxide, calcium salts, and lanthanide compounds serving as components of an extraction residue generated by subjecting an ore or a concentrate for collecting tantalum, niobium, or a similar substance to a fluoridation process involved in a method of producing tantalum, niobium, or a similar substance.

The present inventors have investigated, through a method such as X-ray diffractometry, the extraction residue generated through a fluoridation process involved in production of tantalum, niobium, or a similar substance, and have identified a variety of components other than species recited in claim 9. The reason for selecting, as the additive which is substance insoluble to hydrofluoric acid or a mixed acid containing hydrofluoric acid as an essential component, the species recited in claim 9 from all identified components will next be described.

In order to employ a compound as the additive; i.e., a substance insoluble to hydrofluoric acid or a mixed acid containing hydrofluoric acid as an essential component, the compound must be a component contained in the extraction residue; must be insoluble to a high-concentration acid solution containing hydrofluoric acid or a mixed acid containing hydrofluoric acid as an essential component; and must be stable against heat applied or chemicals employed during production of tantalum, niobium, or a similar substance. For example, although a compound such as iron oxide is a component of the extraction residue, the compound which dissolves in a high-concentration acid solution cannot provide an effect for increasing the amount of the extraction residue. When employment of resin particles is considered, some types of these particles dissolve in a high-concentration acid solution, and others melt at high temperature, failing to maintain the powder state.

From these criteria, barium oxide, barium sulfate, and aluminum oxide exhibit excellent chemical and thermal stability during production of tantalum and niobium. When these compounds are produced by a wet process, surfaces of the particles are rough, and therefore, the particles physically adsorb components in an extraction residue to thereby possibly fix and remove the components and enhance recovery of the residue. In addition, although the details will be provided in a later portion of the specification, commercial products of these compounds are easily available in a variety of particle sizes with high size uniformity.

Calcium salts and lanthanide compounds are brought into contact with a solution containing hydrofluoric acid, to thereby form fluorides thereof. Similarly, these compounds are brought into contact with a mixed acid containing hydrofluoric acid and sulfuric acid, to thereby form a type of gypsum. These fluorides and gypsum species exhibit excellent chemical and thermal stability during production of tantalum and niobium. Examples of employable calcium salts include calcium carbonate, calcium hydroxide, calcium oxide, calcium sulfates such as gypsum, and calcium fluoride. Other than calcium fluoride, some salts form calcium fluoride in the solution containing hydrofluoric acid, resulting in consumption of hydrofluoric acid. Thus, the amount of hydrofluoric acid must be controlled to compensate for the above loss. Examples of employable lanthanide compounds include oxides, water-soluble salts, and fluorides of lanthanide such as lanthanum or cerium. Similar to the case of calcium salts, other than fluorides, the amount of hydrofluoric acid must be controlled to compensate for the above loss. The aforementioned compounds are suitably employed as the additives and may be employed in combination of a plurality of species.

In claim 10, there is provided an ingredient-regulated raw material as described in any one of claims 5 to 9, the substance insoluble to hydrofluoric acid or a mixed acid containing hydrofluoric acid as an essential component serving as an additive is a powder having an average particle size of 0.5 $\mu$m to 100 $\mu$m. When the substance insoluble to hydrofluoric acid or a mixed acid containing hydrofluoric acid as an essential component and serving as the additive is such a powder, the substance readily disperses in the solution to form a slurry.

The reason for controlling the average particle size of "the substance insoluble to hydrofluoric acid or a mixed acid containing hydrofluoric acid as an essential component and serving as an additive" to 0.5 m$\mu$ to 100 $\mu$m is that collection of the extraction residue is planned to be carried out through a method such as a sedimentation method involving allowing the solution to stand, or a filtration method making use of a filter such as a filter-press. Specifically, when the particles have an average particle size of less than 0.5 $\mu$m, the sedimentation rate is slow during sedimentation and leakage from a filter easily occurs during filtration, whereas when the particles have an average particle size in excess of 100 μm, an excessively high sedimentation rate results in poor dispersibility during dissolution to form a slurry. Thus, dispersion of a radioactive substance is insufficient and segregation thereof possibly occurs in the bottom of the sedimentation bath. Also, particles having an average particle size in excess of 100 μm are disadvantageous, since these particles cause damage to an acid-resistant lining of an apparatus such as a stirrer or a pump.

Modes for Carrying Out the Invention

The present invention will next be described by way of Examples, and Comparative Example.

EXAMPLE 1

In Example 1, which is based on a direct extraction method, a concentrate (species A) which had been obtained by subjecting an ore containing tantalum and niobium to flotation was employed as a raw material. The concentrate was subjected to X-ray fluorescent analysis (employed analyzer: LAB CENTER XRF-1700, product of Shimadzu Corporation), to thereby obtain the chemical composition as shown in Table 1. Quantitative determination was performed through a fundamental parameter method. The analysis revealed that uranium oxide and thorium oxide—radioactive substances—were contained at 0.03 wt. % and 0.02 wt. %, respectively. The radioactivity was measured through total β ray dosimetry, to provide a total β ray dose of 55.5 Bq/g (1.5 nCi/g).

Gypsum ($CaSO_4.H_2O$) powder (1 kg) was added to the thus-prepared concentrate (1 kg), to thereby prepare an ingredient-regulated raw material. Subsequently, a fluoridation process was carried out. Specifically, the raw material was placed into a solvent-extraction bath, and a 80 wt. % hydrofluoric acid solution (1 kg) was added to the bath. The mixture was stirred at 85° C. for 16 hours, to thereby effect extraction. Subsequently, a 98 wt. % sulfuric acid solution (300 ml) was introduced to the extraction bath, and the mixture was stirred. After completion of cooling, the mixture was subjected to filtration by means of a filter-press, to thereby separate the mixture into an extract and an extraction residue.

The thus-obtained extraction residue was dried at low temperature and weighed. Chemical analysis of the residue was performed through X-ray fluorescent analysis. The results are shown in Table 1. As is clear from table 1, the uranium oxide content and the thorium oxide content in the extraction residue were 0.02 wt. % and 0.02 wt. %, respectively, which are the same levels as those of the concentrate (species A). This indicates that no concentration of radioactive substances occurs in the extraction residue.

From the aforementioned extract, tantalum and niobium were collected. The produced tantalum product and niobium product were confirmed to have excellent physical properties and purity.

In order to confirm the aforementioned effect of Example 1, the present inventors carried out the following Comparative Example (hereinafter referred to as Comparative Example 1). In Comparative Example 1, the procedure of Example 1 was repeated, except that the concentrate (species A) to which no gypsum powder had been added was used. In a manner similar to that of Example 1, the obtained extraction residue was weighed, and the residue was subjected to chemical analysis. The results are also shown in Table 1. As is clear from table 1, the uranium oxide content and the thorium oxide content in the extraction residue were 0.17 wt. % and 0.10 wt. %, respectively, indicating that the content values of the concentrate (species A) were concentrated by a factor of five or more. In Japan, such a high-radioactive-substance-content extraction residue must be handled with particular care.

EXAMPLE 2

In Example 2, which is based on an extraction method involving an alkali pretreatment, a concentrate (species A) which had been obtained by subjecting an ore containing tantalum and niobium to flotation was employed as a raw material.

In a manner similar to that of Example 1, gypsum ($CaSO_4.H_2O$) powder (1 kg) was added to the concentrate (1 kg), to thereby prepare an ingredient-regulated raw material. Subsequently, the raw material was placed into an alkali-pretreatment bath, and a 48 wt. % caustic soda solution (2 l) was added to the bath. The mixture was stirred at 90° C. for 24 hours, to thereby carry out alkali pretreatment. Subsequently, a sulfuric acid solution was added to the alkali-pretreatment bath, to thereby adjust the pH to 2. The mixture was subjected to filtration, to thereby separate the mixture into an alkali pretreatment extract and an alkali pretreatment extraction residue.

To the alkali pretreatment extraction residue, an 80 wt. % hydrofluoric acid solution (1.5 l) was added. The mixture was stirred 60° C. for 36 hours. After completion of the treatment, a 98 wt. % sulfuric acid solution was further added such that the sulfuric acid concentration was regulated to 1 mol/l, to thereby separate the mixture into an extract and an extraction residue.

In a manner similar to that of Example 1, the obtained extraction residue was weighed and subjected to chemical analysis. The results are also shown in Table 1. As is clear from table 1, the uranium oxide content and the thorium oxide content in the extraction residue were 0.02 wt. % and 0.02 wt. %, respectively, which are the same levels as those of the concentrate (species A). This indicates that no concentration of radioactive substances occurs in the extraction residue. In a manner similar to that of Example 1, tantalum and niobium were collected from the thus-obtained extract. The produced tantalum product and niobium product were confirmed to have excellent physical properties and purity.

TABLE 1

| Samples | Weight (g) | Found (wt. %) | | | | | | | |
|---|---|---|---|---|---|---|---|---|---|
| | | $Ta_2O_5$ | $Nb_2O_5$ | $Fe_2O_3$ | MnO | $SiO_2$ | CaO | $U_3O_8$ | $ThO_2$ |
| Concentrate (species A) | 1000 | 30.6 | 41.3 | 11.0 | 5.4 | 0.6 | 0.2 | 0.03 | 0.02 |
| Ex. 1 | 365 | 0.8 | 1.0 | 0.8 | 0.2 | 0.0 | 89.2 | 0.02 | 0.02 |

TABLE 1-continued

| Samples | Weight (g) | Found (wt. %) | | | | | | |
|---|---|---|---|---|---|---|---|---|
| | | Ta$_2$O$_5$ | Nb$_2$O$_5$ | Fe$_2$O$_3$ | MnO | SiO$_2$ | CaO | U$_3$O$_8$ | ThO$_2$ |
| Ex. 1 (residue) | | | | | | | | | |
| Ex. 2 (residue) | 375 | 0.9 | 1.1 | 0.7 | 0.2 | 0.0 | 87.5 | 0.02 | 0.02 |
| Comp. Ex. 1 (residue) | 25 | 1.4 | 1.7 | 1.1 | 0.4 | 0.1 | 0.2 | 0.17 | 0.10 |

As is clear from Table 1, in Comparative Example 1, concentration of radioactive substances occurred in the extraction residue of small amount, whereas concentration of radioactive substances in the extraction residue can be prevented by employment of the method according to the present invention.

Effects of the Invention

According to the method of the present invention, the radioactive substance content in an ore or a concentrate can be controlled arbitrarily in the production of tantalum, niobium, or a similar substance, and the radioactive substance content can be maintained in an extraction residue generated through a fluoridation process. As a result, since no concentration of radioactive elements occurs, strict measures against radioactivity can be omitted during treatment of the extraction residue while the operator's safety can be assured.

What is claimed is:

1. A method of producing a metal or a metal compound from an ingredient-regulated metal-containing raw material obtained by mixing an ore or a concentrate containing a radioactive substance, the method comprising a fluoridation process and collection and refinement of the metallic component from the extract, the fluoridation process including treating the ingredient-regulated raw material with hydrofluoric acid or a mixed acid containing, as an essential component, hydrofluoric acid, and separating the resultant mixture into an extract into which a metallic component is eluted and an extraction residue, wherein the employed ingredient-regulating raw material comprises the ore or the concentrate containing a radioactive substance and, as an additive, a substance insoluble to hydrofluoric acid or to a mixed acid containing, as an essential component, hydrofluoric acid, to thereby control to an arbitrary value of 1.0 wt. % or less the ratio of the amount of radioactive substance remaining in the extraction residue generated through the fluoridation process to the weight of the extraction residue.

2. A method of producing tantalum, niobium, or a similar substance from an ingredient-regulated metal-containing raw material obtained by mixing an ore or a concentrate containing at least one of tantalum and niobium and a radioactive substance, the method comprising a fluoridation process and collection and refinement of tantalum, niobium, or a similar substance from the extract, the fluoridation process including treating the ingredient-regulated raw material with hydrofluoric acid or a mixed acid containing, as an essential component, hydrofluoric acid, and separating the resultant mixture into an extract into which a metallic component is eluted and an extraction residue, wherein the employed ingredient-regulating raw material comprises the ore or the concentrate containing a radioactive substance and, as an additive, a substance insoluble to hydrofluoric acid or to a mixed acid containing, as an essential component, hydrofluoric acid, to thereby control to an arbitrary value of 1.0 wt. % or less the ratio of the total amount of radioactive substance, U$_3$O$_8$ and ThO$_2$, remaining in the extraction residue generated through the fluoridation process to the weight of the extraction residue.

3. A method of producing a metal or a metal compound from metal-containing ore or a metal-containing concentrate containing a radioactive substance, the method comprising a fluoridation process and collection and refinement of the metallic component from the extract, the fluoridation process including treating said ingredient-regulated raw material with hydrofluoric acid or a mixed acid containing hydrofluoric acid as an essential component, and separating the resultant mixture into an extract into which a metallic component is eluted and an extraction residue, wherein the ore or the concentrate containing a radioactive substance is employed as a raw material, and a substance insoluble to hydrofluoric acid or to a mixed acid containing hydrofluoric acid as an essential component employed in a fluoridation process is added during said fluoridation process, to thereby control to an arbitrary value of 1.0 wt. % or less the ratio of the amount of radioactive substance remaining in the extraction residue generated through the fluoridation process to the weight of the extraction residue.

4. A method of producing tantalum, niobium, or a similar substance from an ore or a concentrate containing at least one of tantalum and niobium and a radioactive substance, the method comprising a fluoridation process and collection and refinement of the metallic component from the extract, the fluoridation process including treating said ore or concentrate with hydrofluoric acid or a mixed acid containing hydrofluoric acid as an essential component, and separating the resultant mixture into an extract into which a metallic component is eluted and an extraction residue, wherein the ore or the concentrate containing at least one of tantalum and niobium and a radioactive substance is employed as a raw material, and a substance insoluble to hydrofluoric acid or to a mixed acid containing hydrofluoric acid as an essential component employed in a fluoridation process is added during said fluoridation process, to thereby control to an arbitrary value of 1.0 wt. % or less the ratio of the amount of radioactive substances, $U_3O_8$ and $ThO_2$, remaining in the extraction residue generated through the fluoridation process to the weight of the extraction residue.

5. An ingredient-regulated raw material to be employed in a method of producing a metal or a metal compound as recited in claim 1, said ingredient-regulate raw material being a mixture comprising an ore or a concentrate containing a radioactive substance and a target metal or a similar substance at a grade of 50 wt. % or more based on the weight of the ore or the concentrate and at least, as an additive, a substance insoluble to hydrofluoric acid in an amount corresponding to the amount of the raw material removed through dissolution-extraction by use of hydrofluoric acid or insoluble to a mixed acid containing hydrofluoric acid as an essential component employed in the fluoridation process.

6. An ingredient-regulated raw material to be employed in a method of producing tantalum, niobium, or a compound as recited in claim 2, said ingredient-regulated raw material being a mixture comprising an ore or a concentrate containing $Ta_2O_5$ and $Nb_2O_5$ in a total amount of 50 wt. % or more based on the weight of the ore or the concentrate and at least, as an additive, a substance insoluble to hydrofluoric acid in an amount corresponding to the amount of the raw material removed through dissolution-extraction by use of hydrofluoric acid or insoluble to a mixed acid containing hydrofluoric acid as an essential component employed in the fluoridation process.

7. An ingredient-regulated raw material as recited in claim 5, wherein the substance insoluble to hydrofluoric acid or a mixed acid containing hydrofluoric acid as an essential component serving as an additive for the raw material is added such that the amount of the substance reaches 5–50 wt. % of the ingredient-regulated raw material.

8. An ingredient-regulated raw material as recited in claim 5, wherein the substance insoluble to hydrofluoric acid or a mixed acid containing hydrofluoric acid as an essential component serving as an additive is at least one component included in an extraction residue of an ore or a concentrate generated through a fluoridation process involved in a method of producing a metal or a metal compound.

9. An ingredient-regulated raw material as recited in claim 6, wherein the substance insoluble to hydrofluoric acid or to a mixed acid containing hydrofluoric acid as an essential component serving as an additive, comprises at least one species selected from among barium oxide, barium sulfate, aluminum oxide, calcium salts, and lanthanide compounds serving as components of an extraction residue generated by subjecting an ore or a concentrate for collecting tantalum, niobium, or a similar substance to a fluoridation process involved in a method of producing tantalum, niobium, or a similar substance.

10. An ingredient-regulated raw material as described in claim 5, the substance insoluble to hydrofluoric acid or a mixed acid containing hydrofluoric acid as an essential component serving as an additive is a powder having an average particle size of 0.5 $\mu$m to 100 $\mu$m.

* * * * *

UNITED STATES PATENT AND TRADEMARK OFFICE
CERTIFICATE OF CORRECTION

PATENT NO. : 6,641,641 B2 Page 1 of 1
DATED : November 4, 2003
INVENTOR(S) : Yoshio Sohama et al.

It is certified that error appears in the above-identified patent and that said Letters Patent is hereby corrected as shown below:

<u>Title page,</u>
Item [30], add the Foreign Application Priority Data information:

-- Foreign Application Priority Data

September 12, 2000 (JP) 2000-276366 --

Signed and Sealed this

Thirteenth Day of April, 2004

JON W. DUDAS
*Acting Director of the United States Patent and Trademark Office*